United States Patent [19]
Zou et al.

[11] Patent Number: 5,818,714
[45] Date of Patent: Oct. 6, 1998

[54] PROCESS CONTROL SYSTEM WITH ASYMPTOTIC AUTO-TUNING

[75] Inventors: Hehong Zou, Plymouth; Scott E. Brigham, St. Paul, both of Minn.

[73] Assignee: Rosemount, Inc., Eden Prairie, Minn.

[21] Appl. No.: 690,778

[22] Filed: Aug. 1, 1996

[51] Int. Cl.$^6$ ................................................ G06B 13/02
[52] U.S. Cl. ........................ 364/154; 364/154; 364/159; 364/164; 364/166
[58] Field of Search .................................. 364/157, 159, 364/160, 161, 162, 163

[56] References Cited

U.S. PATENT DOCUMENTS

| | | | |
|---|---|---|---|
| 3,727,035 | 4/1973 | Pemberton | 235/150.1 |
| 4,006,346 | 2/1977 | Pemberton | 235/150.1 |
| 4,232,364 | 11/1980 | Bibbero | 364/105 |
| 4,441,151 | 4/1984 | Hayashibe | 364/157 |
| 4,563,734 | 1/1986 | Mori et al. | 364/157 |
| 4,602,326 | 7/1986 | Kraus | 364/158 |
| 4,641,235 | 2/1987 | Shingemasa et al. | 364/139 |
| 4,646,226 | 2/1987 | Moon | 364/176 |
| 4,669,040 | 5/1987 | Pettit et al. | 364/162 |
| 4,679,136 | 7/1987 | Shingemasa | 364/150 |
| 4,719,561 | 1/1988 | Shingemasa | 364/148 |
| 4,814,968 | 3/1989 | Fukumoto | 364/150 |
| 4,852,053 | 7/1989 | Turrie | 364/151 |
| 4,855,674 | 8/1989 | Murate et al. | 324/158 R |
| 4,882,526 | 11/1989 | Iino et al. | 318/561 |
| 4,885,897 | 12/1989 | Shinskey | 324/148 |
| 4,983,898 | 1/1991 | Kanda | 318/561 |
| 5,043,862 | 8/1991 | Takahashi et al. | 364/162 |
| 5,057,993 | 10/1991 | Kanda | 364/162 |
| 5,126,933 | 6/1992 | White, III | 364/148 |
| 5,153,807 | 10/1992 | Saito et al. | 364/165 |
| 5,159,547 | 10/1992 | Chand | 364/157 |
| 5,170,341 | 12/1992 | Sklaroff | 340/870.16 |
| 5,184,122 | 2/1993 | Decious et al. | 340/870.16 |
| 5,283,729 | 2/1994 | Lloyd | 364/157 |
| 5,331,541 | 7/1994 | Ueda et al. | 364/162 |
| 5,333,114 | 7/1994 | Warrior et al. | 364/550 |
| 5,341,288 | 8/1994 | Shinskey et al. | 364/159 |
| 5,371,670 | 12/1994 | Lurie | 364/160 |
| 5,406,474 | 4/1995 | Hansen | 364/148 |
| 5,453,925 | 9/1995 | Wojsznis et al. | 364/157 |
| 5,485,400 | 1/1996 | Warrior et al. | 364/550 |
| 5,504,672 | 4/1996 | Hardiman et al. | 364/165 |
| 5,519,605 | 5/1996 | Cawlfield | 364/151 |
| 5,587,899 | 12/1996 | Ho et al. | 364/157 |

FOREIGN PATENT DOCUMENTS

| | | |
|---|---|---|
| 0 037 565 | 5/1980 | European Pat. Off. . |
| 2 600 789 | 12/1987 | France . |

(List continued on next page.)

OTHER PUBLICATIONS

"PID Tuning: It's The Method, Not the Rules," D. W. St. Clair and P. S. Fruehauf, *Intech Engineer's Notebook*, Dec. 1994, pp. 27–30.

(List continued on next page.)

*Primary Examiner*—Reba I. Elmore
*Assistant Examiner*—Ramesh Patel
*Attorney, Agent, or Firm*—Westman, Champlin & Kelly, P.A.

[57] ABSTRACT

A process control system controls a non-self regulating process through a control output signal based on a set point and a measured process variable. The process control system includes a control circuit having a set point input, a process variable input and a control output. The control circuit generates the control output signal on the control output as a function of the set point received on the set point input and the measured process variable received on the process variable input. An auto-tuning circuit excites the process, estimates a process model based on an intersection between rising and falling asymptotes of the measured process variable, and then tunes the control function to the process based on the process model. The auto-tuning circuit obtains robust results, but is computationally simple such that the circuit can be implemented with hardware or software in low-power and low-memory applications, such as in field-mounted controllers.

22 Claims, 5 Drawing Sheets

FOREIGN PATENT DOCUMENTS

| | | |
|---|---|---|
| 56-57106 | 5/1981 | Japan . |
| 59-698807 | 4/1984 | Japan . |
| 62-280903 | 12/1987 | Japan . |
| 1-95301 | 4/1989 | Japan . |
| 01-304174 | 11/1989 | Japan . |
| 2-50701 | 2/1990 | Japan . |
| 2-297604 | 12/1990 | Japan . |
| 3-152601 | 6/1991 | Japan . |
| 3-235101 | 10/1991 | Japan . |
| 3-268102 | 11/1991 | Japan . |
| 4-34602 | 2/1992 | Japan . |
| 4-84201 | 3/1992 | Japan . |
| 4-102102 | 4/1992 | Japan . |
| 5-27804 | 2/1993 | Japan . |
| 6-35510 | 2/1994 | Japan . |
| 6-266408 | 9/1994 | Japan . |
| 7-31522 | 4/1995 | Japan . |

OTHER PUBLICATIONS

"Tuning Process Controllers," T. B. Kinney, *Chemical Engineering*, Sep. 19, 1983, pp. 67–72.

"Internal Model Control. 4. PID Controller Design," D. E. Rivera, M. Morari, S. Skogestad, *Industrial & Engineering Chemistry Process Design and Development*, vol. 25, No. 1, Jan. 1986, pp. 252–265.

"Auto–Tuning," *Adaptive Control*, K. J. Astrom and B. Wittenmark, Published by Addiston–Wesley Publishing Company, copyright 1989, pp. 328–342.

Advertising Brochure: "Excalibur 7000. The Cutting Edge of Technology." Robertshaw Tennessee, undated.

Advertisement: "Excalibur 7000. The Cutting Edge of Technology." published in *Instrumentation & Control Systems*, Sep. 1995, vol. 68, No. 9.

"Autotuning," *Automatic Tuning of PID Controllers*, K. J. Astrom and T. Hagglund, published by Instrument Society of America, Copyright 1988, pp. 105–110.

"Design of PID Controllers," *Automatic Tuning of PID Controllers*, K. J. Astrom and T. Hagglund, published by Instrument Society of America, Copyright 1988, pp. 51–61.

Industrial Instrumentation Condensed Catalog, Robertshaw Tennessee, Apr. 1992.

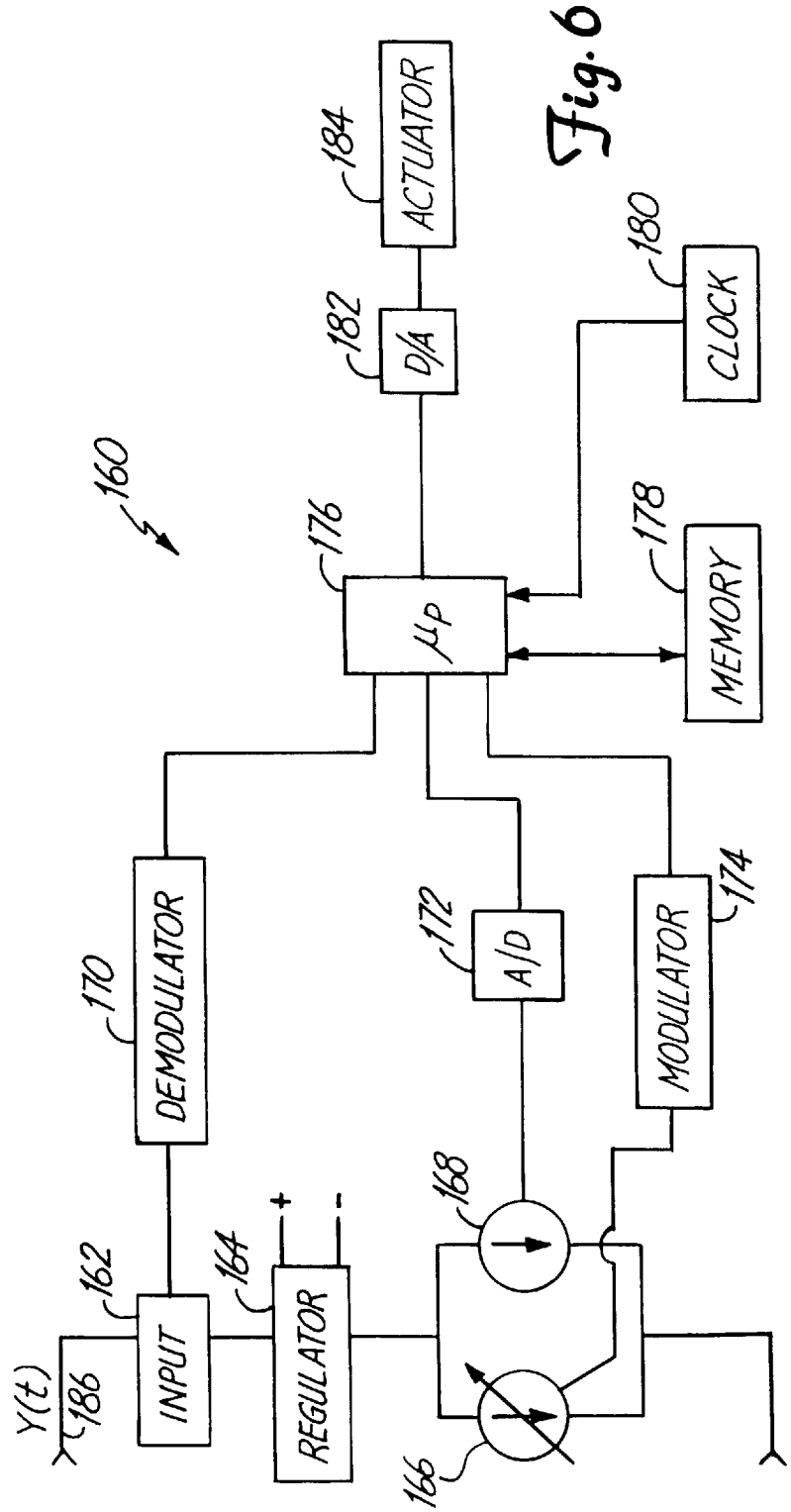

5,818,714

PROCESS CONTROL SYSTEM WITH ASYMPTOTIC AUTO-TUNING

CROSS REFERENCE TO RELATED APPLICATION

Cross reference is made to U.S. application Ser. No. 08/515,410, filed Aug. 15, 1995, and entitled Field Based Process Control System With Auto-Tuning, which is hereby incorporated by reference.

BACKGROUND OF THE INVENTION

The present invention relates to an industrial process controller with low-complexity and robust auto-tuning which can be implemented in low power and memory applications, such as a field mounted controller, hand-held device or in a personal computer.

Field mounted controllers include various devices, such as transmitters, actuators, transducers, switches, valve positioners and stand-alone controllers. Field mounted controllers are used in process control systems to control the process, measure process variables and to generate outputs representative of the process variables for communication to central controllers or field control elements (e.g. valves) over process control loops. The loops have included two-wire, three-wire and four-wire loops. Other loops have also been used, such as optical and radio frequency control loops.

Field mounted controllers are mounted in a field area where current and voltage levels are typically limited to provide intrinsic safety. The units are often powered over the control loop. A separate transducer senses each process variable and provides the sensed variable to a transmitter for transmission to the central controller. Controllers can be located in a central control room or in the field and combine the transducer outputs to generate appropriate control output signals. Control output signals are typically sent over a separate control loop to remote actuators, such as valves or motor drives, which control the process according to the control output signals. In certain applications, controllers select the most appropriate set of instructions for process control equipment.

In one application, the transmitter itself includes a control function which provides the control output signals to the remote devices directly, thereby bypassing the central controller. A control function can also be located in the other field control elements, such as valves. This type of controller is referred to as a "smart" field mounted controller and is disclosed in more detail in U.S. Pat. No. 5,485,400, which is hereby incorporated by reference.

The control algorithm or equation performed by the controller in the transmitter or in the central control room is specially tailored to the process in which the controller is used. Several basic control algorithms exist, including Proportional (P), Proportional-Integral (PI) Proportional-Derivative (PD) and Proportional-Integral-Derivative (PID) control algorithms. The performance of the control algorithm is determined by control parameters, such as $K_P$, $T_I$ and $T_D$ which correspond to the proportional gain, integral time and derivative time, respectively, for an ideal-type of PID control algorithm. In some applications, $K_P$ is replaced with a proportional band parameter PB, which is a function of $K_P$. Other types of PID control algorithms exist, such as parallel and serial equations. These algorithms have corresponding parameters which are similar to the ideal-type parameters. The control parameters are tuned based on a model of the underlying process to operate the process optimally.

One of the most important tasks in tuning the control parameters is defining the initial process model and estimating the corresponding model parameters. A model for a non-self-regulating process, such as a level control process, can be defined by an integrating equation. The corresponding model parameters are estimated by disturbing the process and observing a response in the process variable.

Several tuning methods are available to tune the control parameters once the process model parameters have been determined. In the Ziegler-Nichols' open-loop tuning method, the process variable y(t) is manually or automatically controlled to a stable state $Y_{SS}$ and a step function is applied to a control signal u(t). The process model parameters are then estimated by observing the response in the process variable. The process model parameter estimation is normally sensitive to the steady state value $Y_{SS}$. It is difficult to obtain desired closed loop responses if the steady state $Y_{SS}$ is not ideally established before starting the step function or if the field control element has hysteresis.

In the modified Ziegler-Nichols' frequency domain (closed loop) method, a relay feedback signal is added to a stable state control signal $u(t)=U_{SS}$ and toggled between two values to cause limit cycle oscillations in the process variable from which frequency domain parameters (ultimate period $T_U$ and gain $K_U$) can be estimated. The control parameters are then generated according to an experimentally based formula. The estimation of frequency parameters $T_U$ and $K_U$ is also sensitive to $Y_{SS}$. In addition, load and valve friction make tuning difficult and may lead to less than optimized tuned loops. For the purpose of robust and repeatable tuning, a pretuning stage is often needed to have a stable state $Y_{SS}$ before applying the disturbance to the process. The need for pretuning increases the algorithm complexity and the tuning time. The added complexity makes it difficult, if not impossible, to implement such a tuning algorithm in applications having limited power, memory and computational capability, such as in field-mounted control transmitters. These methods and other tuning methods are described in K. Astrom and B. Wittenmark, *Adaptive Control*, Addison-Wesley Publishing, Chapter 8 (1989).

SUMMARY OF THE INVENTION

The process control system of present invention includes a controller having a process variable input and a control output. The controller generates a control output signal on the control output as a function of a measured process variable received on the process variable input. An auto-tuner is coupled to the controller. The auto-tuner excites a non-self regulating process, estimates a process model based on an intersection between rising and falling asymptotes of the measured process variable, and then tunes the control function to the process based on the process model.

The auto-tuner obtains robust results, but is computationally simple such that the circuit can be implemented with hardware or software in low-power and low-memory applications, such as in transmitter or valve based field-mounted controllers.

BRIEF DESCRIPTION OF THE DRAWINGS

FIG. 6 is a block diagram of a valve having a controller according to the present invention.

DETAILED DESCRIPTION OF THE PREFERRED EMBODIMENTS

The present invention is a process control system having a robust auto-tuning feature which is computationally simple such that the system can be implemented in a low-power field-mounted controller in a process control system.

Figure 1:
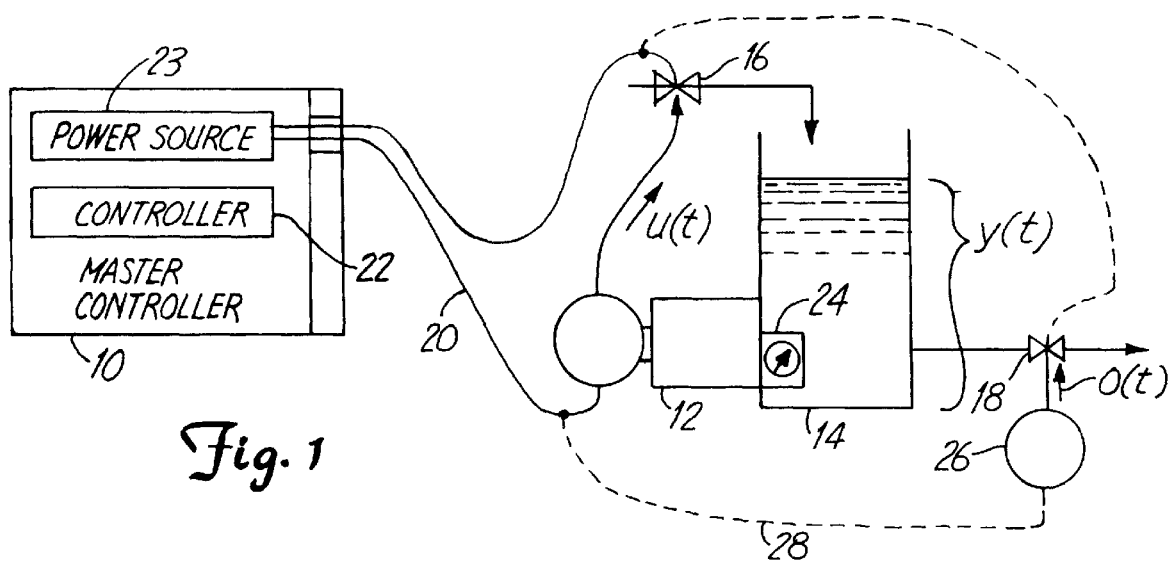
FIG. 1 is a diagram of a level control system according to one embodiment of the present invention.

FIG. 1 is a diagram of one embodiment in which the process control system of the present invention is useful. The process control system includes master controller 10, transmitter 12, tank 14, input valve 16 and output valve 18. Master controller 10 is coupled to transmitter 12 and input valve 16 through two-wire process control loop 20. Loop 20 can include a 4–20 mA or a 10–50 mA current loop, for example, which allows master controller 10, transmitter 12 and valve 16 to communicate with one another by varying the current level through the loop. In an alternative embodiment, master controller 10, transmitter 12 and valve 16 communicate by varying the voltage level on loop 20. Concurrently, master controller 10 and transmitter 12 communicate digitally over loop 20 in a carrier modulated fashion, such as in the HART® protocol.

Other digital communication systems can be used, including a Fieldbus Standard which is presently being adopted by the Fieldbus Foundation. Alternatively, loop 20 carries baseband modulated digital signals such as DE protocol. In addition, master controller 10 and transmitter 12 can communicate with one another optically over single or dual optical fibers or by radio frequency. An example of an optical control circuit is disclosed in U.S. Pat. No. 5,333,114, which is hereby incorporated by reference.

Master controller 10 includes a controller 22 and a power source 23 which provide power and control to loop 20. Master controller 10 can be positioned in a central control room or in a remote, field location with transmitter 12. Master controller 10, transmitter 12 and valve 16 can be coupled to one another in a variety of configurations as discussed in more detail in Warrior et al., U.S. Pat. No. 5,485,400.

In the embodiment shown in FIG. 1, the magnitude of current or the value of a digital signal, as is appropriate, flowing through loop 20 represents a control output u(t) which controls flow into tank 14 by controlling the position of valve 16. Transmitter 12 preferably includes its own control function which is capable of taking over the operation of loop 20 from master controller 10 and sinking a variable amount of current to adjust control output u(t). The position of valve 18 controls the flow out of tank 14. Valve 18 is adjusted by a valve control signal o(t) which is provided by a transmitter 26 over a two-wire process control loop 28 which can be coupled to loop 20 in parallel (as shown in phantom) with loop 20 in a cascade fashion. The parallel configuration is referred to as a multidrop configuration. The valve control signal o(t) can also be provided by a separate loop which is coupled to transmitter 12 or master controller 10.

A sensor 24 is coupled to tank 14 for measuring a level y(t) of fluid in the tank. The rate-of-change in level dy(t)/dt is a function of the positions of valves 16 and 18. Control output u(t) has a "direct action" on the process variable y(t) since an increase in u(t) causes an increase in y(t). The signal o(t) has a "reverse action" on the process variable y(t) since an increase in o(t) causes a decrease in y(t). Sensor 24 can include any suitable process variable sensor depending on the application to be controlled, such as an absolute or differential pressure sensor, an ultrasonic sensor or a microwave sensor. Other types of sensors capable of generating a signal representative of the level of fluid in tank 14 can also be used. The level control system shown in FIG. 1 is one example of a non-self-regulating process. The present invention can also be used with other non-self-regulating processes. A non-self-regulating process is a process in which the measured process variable y(t) will continue to increase or decrease as long as the control output u(t) is not equal to a steady state value $U_{SS}$ (i.e., when the inlet and outlet flows are not equal in a level process).

Figure 2:
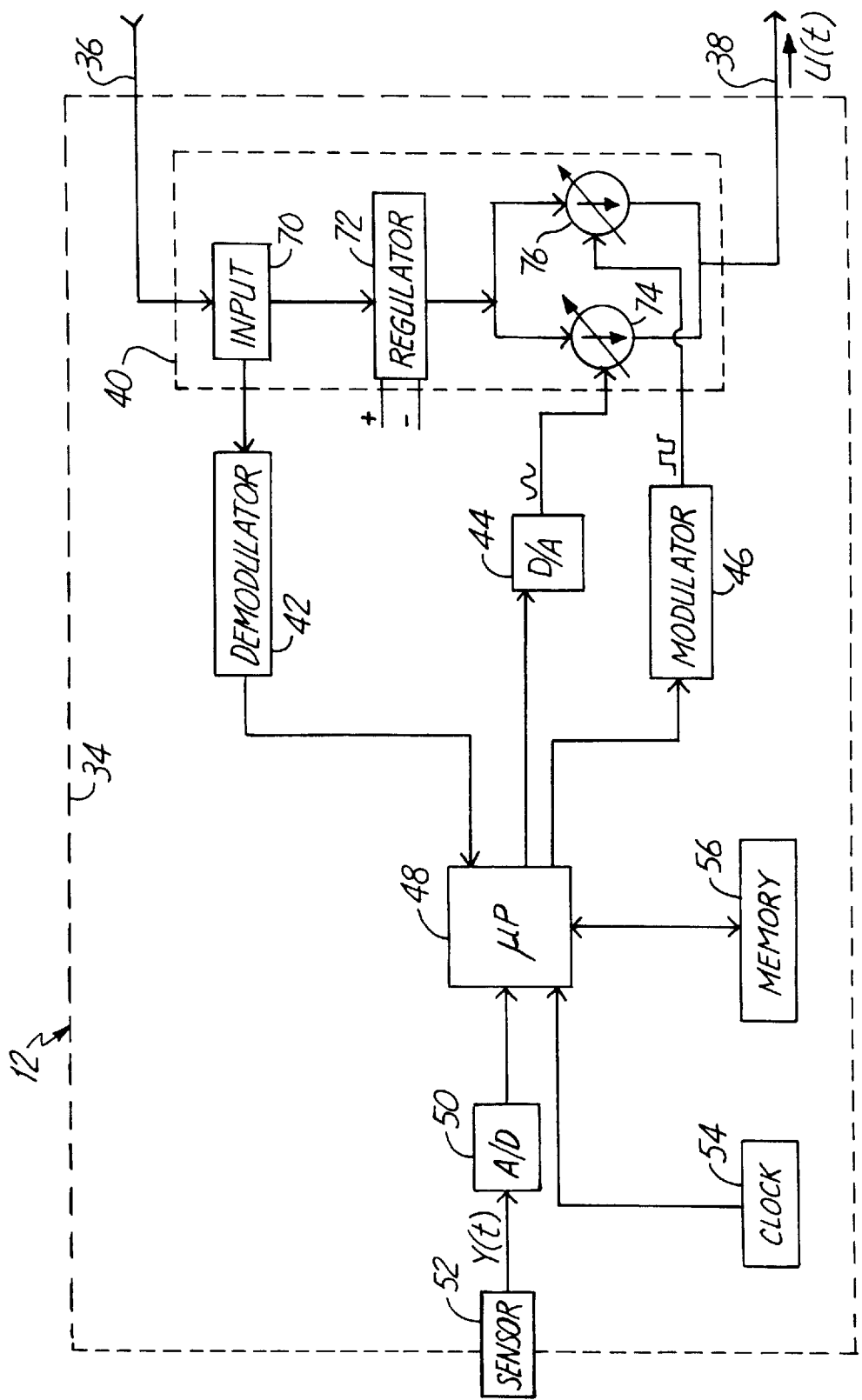
FIG. 2 is a block diagram of a transmitter shown in FIG. 1, which includes a controller.

FIG. 2 is a block diagram of transmitter 12 according to a first preferred embodiment of the present invention. Transmitter 12 is a "smart" transmitter in that it has computing capability, such as that performed by a microprocessor. Transmitter 12 includes a rugged, explosion proof housing 34 for mounting in the field, input terminal 36, output terminal 38, input-output circuit 40, demodulator 42, digital-to-analog (D/A) converter 44, modulator 46, microprocessor 48, analog-to-digital (A/D) converter 50, process variable sensor 52, clock circuit 54 and memory 56. Clock circuit 54 is connected to microprocessor 48 to sequence the operation of the microprocessor.

Input terminal 36 is coupled to master controller 10 (shown in FIG. 1) while output terminal 38 is coupled to valve 16 (also shown in FIG. 1). Input-output circuit 40 is coupled between input terminal 36 and output terminal 38. Circuit 40 includes input filter circuit 70, voltage regulator 72, current sink 74 and current sink 76 which are connected in series with one another in loop 20. Input-output circuit 40 receives process signals from loop 20 at input terminal 36 and supplies control output signals u(t) at output terminal 38 as a function of the process signals. Voltage regulator 72 within input-output circuit 40 receives power from loop 20 and provides a regulated voltage for powering all the various elements of transmitter 12.

The process signals used in generating control output u(t) comprise setpoints representative of a desired process state, process variables produced by the process, commands and whole or partial instruction sets for operating microprocessor 48, coefficients of terms for such instruction sets and status requests from master controller 10. Input filter circuit 70 receives the process signals and directs the signals to demodulator 42. Demodulator 42 demodulates modulated process signals from the current loop and provides corresponding digital information to microprocessor 48. The information can be stored in memory 56 if desired.

Microprocessor 48 also receives process signals from process variable sensor 52. Sensor 52 measures a process variable y(t), such as a level as shown in FIG. 1, and provides the measurement to A/D converter 50 which digitizes the measurement for microprocessor 48. The process variable measurements can then be stored in memory 56 for analysis or transmitted back to master controller 10 over loop 20. Microprocessor 48 transmits digital information to master controller 10 through modulator 46 and current sink 76, which modulates the information onto loop 20. In an alternative embodiment, sensor 52 and A/D converter 50 are located externally to transmitter 12. In this embodiment, the process variable measured by sensor 52 is communicated to microprocessor 48 over loop 20 along with other process variables from different sensors.

Current sink 74 adjusts control output u(t) by adjusting the level of current flowing through loop 20. Microprocessor 48 operates current sink 74 through D/A converter 44 based on a control algorithm or software routine stored in memory 56 and as a function of the measured process variable y(t), stored control parameters and instructions received from master controller 10. For example, master controller 10 may provide a set point $Y_{SET}$ or a command, as appropriate, to microprocessor 48 which instructs the microprocessor to adjust control output u(t) such that the process variable y(t) approaches the set point $Y_{SET}$.

According to the present invention, memory 56 also includes an auto-tuning algorithm or software routine which tunes the control parameters used by the control algorithm to match the process being controlled. The auto-tuning algorithm causes microprocessor 48 to adjust control output u(t) over time and observe a response in the process variable y(t). From this response, microprocessor 48 can estimate model parameters for the process and use the model parameters to calculate the desired control parameters.

The communication methods and transmitter connections discussed with reference to FIG. 2 are provided as examples only. Other configurations can also be used, such as those of a controller connected to a supervisory master, which are described in U.S. Pat. No. 5,333,114.

Auto-Tuning

Figure 3:
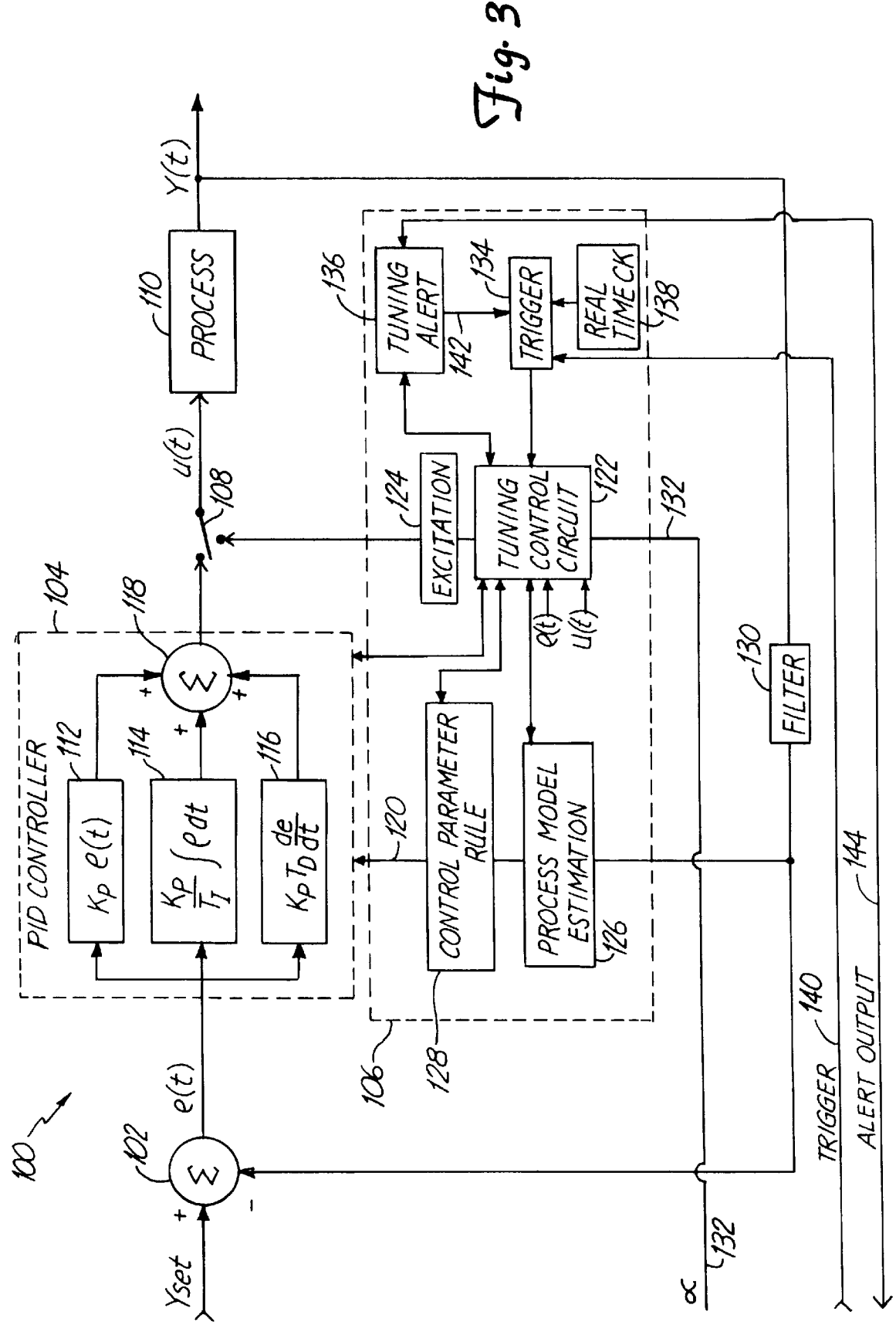
FIG. 3 is a diagram of a process control system of the present invention.

FIG. 3 is an illustration of the auto-tuning and control functions performed by microprocessor 48 according to one embodiment of the present invention. Control system 100 includes summing junction 102, PID controller 104, tuning circuit 106, switching junction 108 and process 110. For a "reverse action" control output, a process variable setpoint $Y_{SET}$ is provided to a positive input of summing junction 102 and the measured process variable y(t) is provided to a negative input of summing junction 102. For a "direct action" control output, $Y_{SET}$ is provided to a negative input of summing junction 102 and y(t) is provided to a positive input of summing junction 102. The output of summing junction 102 generates an error signal e(t) which represents the difference between the setpoint $Y_{SET}$ and the measured process variable y(t). Error signal e(t) is provided to PID controller 104. PID controller 104 includes a proportional gain block 112, an integrating block 114 and a derivative block 116. In an alternative embodiment, the measured process variable y(t) is provided directly to derivative block 116, as opposed to through summing junction 102. The outputs of blocks 112, 114 and 116 are provided to positive inputs of summing junction 118. During closed loop control, the output of summing junction 118 provides the control output u(t) to control process 110. The basic function of PID controller 104 as a standard form controller is defined by Equation 1:

$$u(t) = K_P e(t) + \frac{K_P}{T_I} \int e(t)dt + K_P T_d \frac{de(t)}{dt} \qquad \text{Eq. 1}$$

where $K_P$, $T_I$ and $T_D$ are tuned control parameters that determine the performance of PID controller 104. The control parameters are tuned, or modified according to the present invention to match the characteristics of process 110 at a commissioning stage or at any point during control of the process. Other forms of PID controllers can also be used with the present invention, such as serial and parallel forms. The equations discussed below can be easily modified to cover these other forms of PID controllers.

Tuning circuit 106 includes tuning control circuit 122, excitation circuit 124, process model estimation circuit 126 and control parameter rule circuit 128. Tuning control circuit 122 is coupled to excitation circuit 124, process model estimation circuit 126 and control parameter rule circuit 128 to control the overall function of tuning circuit 106. Excitation circuit 124 provides an open loop excitation signal, which varies over time, to process 110 through switching junction 108. The excitation signal is used as the control output signal during an open loop auto-tuning stage. Switching junction 108 can be an actual switch or can be a transfer of control from one algorithm or software routine to the next. Model estimation circuit 126 then observes the response in the measured process variable y(t) and generates a model of process 110, as is described in greater detail below. This model is provided to control parameter rule circuit 128 for tuning the control parameters for PID controller 104 based on a selected set of tuning rules. The process model and tuned control parameters are then stored in memory 56 (FIG. 2) and can be provided to master controller 10 over process control loop 20 to optimize the supervisory or cascade control of the process. The process model can be provided to other cascade connected devices for use in additional tuning procedures.

Tuning circuit 106 further includes a trigger circuit 134, a tuning alert circuit 136 and a real time clock 138 which are coupled to, or may be incorporated in, tuning control circuit 122. Trigger circuit 134 triggers tuning control circuit 122 to perform the auto-tuning function of the present invention based on trigger signals supplied by trigger input 140, tuning alert circuit 136 or real time clock circuit 138. Trigger input 140 is supplied by microprocessor 48 (FIG. 2) in response to commands provided by master controller 10 over process control loop 20. The commands may be initiated on demand by the user or at the request of master controller 10. Alternatively, real time clock 138 may trigger the auto-tuning function based on a selected time period, such as every half-hour. In an alternative embodiment, real time clock 138 is incorporated in master controller 10 and supplies the trigger signal to trigger input 140 over process control loop 20.

Tuning alert circuit 136 triggers the auto-tuning function through a trigger output 142. During the closed loop control stage, tuning control circuit 122 observes e(t), u(t) and y(t) and passively calculates new control parameters through circuits 126 and 128. Tuning alert circuit 136 compares the new calculations with the previously stored operating process control parameters. If the difference between the calculations is greater than a specified range, tuning alert circuit 136 triggers the auto-tuning function through trigger circuit 134 or notifies the user or master controller 10 through alert output 144. Tuning alert circuit 136 also passively verifies the estimated process model with the process by fitting current values of y(t) and u(t) into the model equation (discussed below) to see if the model is correct. If not, circuit 136 triggers the auto-tuning function or issues an alert on output 144. Circuit 136 also monitors e(t) and y(t) after a set point change or a major disturbance in the process and issues an alert if the desired performance (e.g. critically damped) is not present. For example, the integral of the square of the error signal e(t) or the integral of the absolute value of the error can be compared with a threshold value stored in memory 56. If the error integral exceeds the threshold, circuit 136 issues an alert. In addition, circuit 136 monitors y(t) during the tuning stage. If y(t) is not responding or responds incorrectly, circuit 136 generates a tuning failure alert on output 144. The user can take action to correct the auto-tuning function, such as by changing selected values of the control output u(t) which are used by the auto-tuning function or by changing a performance factor a described below.

Figure 4:
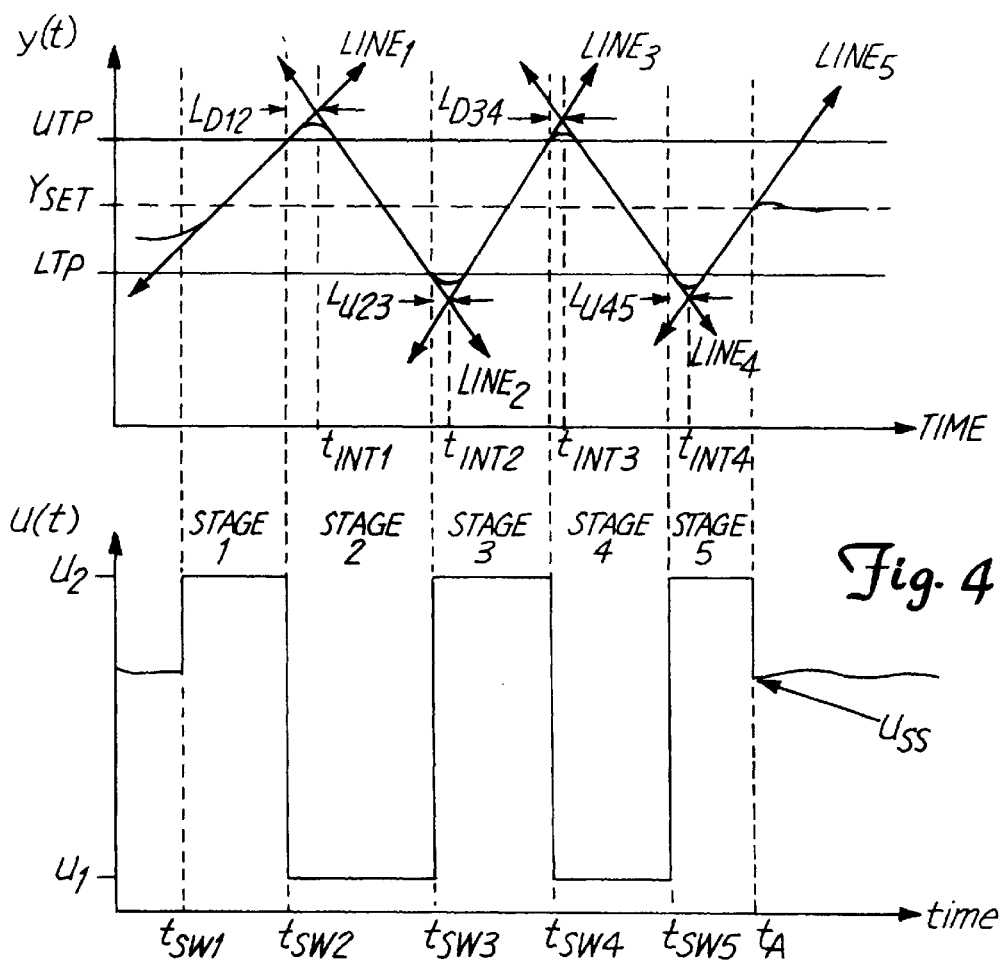
FIG. 4 is a waveform diagram illustrating an asymptotic auto-tuning procedure of the present invention.

FIG. 4 is a diagram illustrating the waveforms of control output u(t) and process variable y(t) during the asymptotic tuning procedure of the present invention. Tuning control circuit 122 alternates the control output u(t) between two user-selected values $U_1$ and $U_2$ and while process model estimation circuit 126 monitors the process variable y(t) as it ramps up and down. Through this process, it is able to determine the rate at which the process variable ramps and the time delay that occurs before the process responds to the control change.

Once the asymptotic auto-tuning procedure has been initiated, tuning control circuit 122 monitors the sign of e(t) to determine whether y(t) is less than or greater then $Y_{SET}$. If e(t) is positive, y(t) is initially below $Y_{SET}$. During stage 1, the control loop is opened at switching junction 108 and excitation circuit 124 forces u(t) to value $U_2$ at switch time $t_{SW1}$ to force y(t) toward an upper transition value UTP. When the process variable y(t) reaches the upper transition value UTP, the control output u(t) switches to valve $U_1$ at switch time $t_{SW2}$ to force y(t) downward toward a lower transition value LTP during stage 2. When the process variable y(t) reaches the lower transition value LTP, the control output u(t) switches again to $U_2$ at switch time $t_{SW3}$ to start the next stage. The number of stages in the auto-tuning procedure can be varied in alternative embodiments, but in a preferred embodiment, there are at least two consecutive stages which create either an up-down transition or a down-up transition in the process variable y(t). The use of multiple stages minimizes the influence of process load changes during the tuning procedure. The last stage in the sequence terminates when the process variable y(t) reaches the set point $Y_{SET}$, at time $t_A$, rather than the upper or lower transition values UTP and LTP. At time $t_A$, the asymptotic auto-tuning procedure ends and process control system 100 becomes a closed PID control loop which adjusts u(t) to bring the process variable to the set point y(t)=$Y_{SET}$.

If the sign of e(t) were positive at switch time $t_{U01}$, then the excitation waveform u(t) shown in FIG. 4 would be inverted. Excitation circuit 124 would apply u(t)=$U_2$ such that y(t) rises toward $Y_{SET}$, then u(t)=$U_1$ such that y(t) falls and then u(t)=$U_2$ such that y(t) rises again.

By varying the control output u(t) over time during the auto-tuning procedure, tuning circuit 106 has the ability to estimate all system parameters accurately with repeatable and robust results such that PID controller 104 provides the desired performance.

The process gain constant can be estimated by looking at the level balance equation of the level process shown in FIG. 1, which can be written as:

$$\frac{dy(t)}{dt} = m_1 u(t-L) - m_2 o(t) \qquad \text{Eq. 2}$$

Equation 2 assumes that valves 16 and 18 have linear operating characteristics and neglects a head pressure effect on the valves. However, the present invention can also be used with valves having non-linear operating characteristics. L is the process lag time and $m_1$ and $m_2$ are process gain constants corresponding to the volume flow into and out of tank 14 divided by the area of tank 14.

When control output u(t) is at a steady state, $U_{SS}$, and the lag time effect disappears, $$\frac{dy(t)}{dt} = 0 = m_1 U_{ss} - m_2 o(t) \qquad \text{Eq. 3}$$

When y(t) is increasing (see FIG. 4), u(t)=$U_2$ and, $$R_R = \frac{dy(t)}{dt} = m_1(U_2 - U_{SS}) \qquad \text{Eq. 4}$$

Similarly, when y(t) is decreasing (see FIG. 4), u(t)=$U_1$ and, $$R_F = \frac{dy(t)}{dt} = m_1(U_{SS} - U_1) \qquad \text{Eq. 5}$$

$R_R$ and $R_F$ are the rate of change of the process variable y(t) for the corresponding control signals $U_2$ and $U_1$, respectively. By solving Equations 4 and 5 for $m_1$, the following mathematical relationship can be derived:

$$m_1 = \frac{R_R - R_F}{U_2 - U_1} \qquad \text{Eq. 6}$$

Thus, the process gain constant can be determined by comparing the rising and falling rates of change in the process variable y(t). Since the process is an integral type of process, the process should follow a straight line under a constant control output u(t) after the rate of change dy(t)/dt reaches its maximum value and the system lag time and time constant have rested. The straight lines can be used to determine the rising and falling rates of change.

Referring to the embodiment shown in FIG. 4, there are five lines labeled $Line_1$ through $Line_5$ which are consecutive asymptotes of the process variable y(t). The slopes of these lines represent the rising and falling rates of change in the process variable y(t). The equation for $Line_I$ (I=1,2,3,4,5) is given by y(t)=$A_I$t+$B_I$ where $A_I$ is the slope of $Line_I$, t is time and $B_I$ is the intercept of $Line_I$. Each line is calculated by obtaining a set of consecutive level samples and their corresponding times and then performing a least squared error fit of the data to a curve. A set of N data pairs ($t_n$, $y_n$) for n=1 to N provides the following equations:

$$y(t_1) = A_I \cdot t_1 + B_I \qquad \text{Eq. 7}$$
$$y(t_2) = A_I \cdot t_2 + B_I$$
$$\ldots$$
$$y(t_N) = A_I \cdot t_N + B_I$$

In matrix form, $$\begin{bmatrix} t_1 & 1 \\ t_2 & 1 \\ \ldots & \ldots \\ t_N & 1 \end{bmatrix} \begin{bmatrix} A_I \\ B_I \end{bmatrix} = \begin{bmatrix} y(t_1) \\ y(t_2) \\ \ldots \\ y(t_N) \end{bmatrix} \qquad \text{Eq. 8}$$

This equation can be solved to estimate A and B while minimizing the least squared error, which results in, $$\begin{bmatrix} A_I \\ B_I \end{bmatrix} = \frac{1}{N\Sigma t_n^2 - (\Sigma t_n)^2} \begin{bmatrix} N \cdot \Sigma t_n y(t_n) - \Sigma t_n \cdot \Sigma y(t_n) \\ \Sigma t_n^2 \cdot \Sigma y(t_n) - \Sigma t_n \cdot \Sigma t_n y(t_n) \end{bmatrix} \qquad \text{Eq. 9}$$

Given the equation for each $Line_I$, the process lag time L is estimated by finding the time at which two consecutive lines intersect and then $t_{INT}$ (such as $t_{INT1}$, $t_{INT2}$, $t_{INT3}$ and $t_{INT4}$ in FIG. 4) calculating the difference between the intersection time $t_{INT}$ and the corresponding control output switch time $t_{SW}$ (such as $t_{SW1}$, $t_{SW2}$, $t_{SW3}$ and $t_{SW4}$ in FIG. 4). The equations for two consecutive lines or asymptotes is, $$y_1(t) = A_1 \cdot t + B_1; \text{ for } u(t) = U_1 \text{ when } t < t_{SW}$$
$$y_2(t) = A_2 \cdot t + B_2; \text{ for } u(t) = U_2 \text{ when } t > t_{SW} \qquad \text{Eq. 10}$$

At the intersection $t_{INT}$, $$y_1(t_{INT})=A_1t_{INT}+B_1=y_2(t_{INT})=A_2 t_{INT}+B_2 \quad \text{Eq. 11}$$

which gives, $$t_{INT} = \frac{B_2 - B_1}{A_1 - A_2} \quad \text{Eq. 12}$$

With the process gain constant $m_1$ determined by Equation 6, the line equations for two consecutive asymptotes determined from Equation 9 and the intersection time $t_{INT}$ determined from Equation 12, process estimation circuit 126 estimates the process gain constant $m_1$, lag time L and steady state control signal $U_{EST}$ according to the following equations:

$$U_{EST} = \frac{A_1 U_1 + A_2 U_2}{A_1 + A_2} \quad \text{Eqs. 13–15}$$

$$m_1 = \frac{A_2 - A_1}{U_2 - U_1}$$

$$L = t_{INT} - t_{SW} = \frac{B_2 - B_1}{A_1 - A_2} - t_{SW}$$

In a preferred embodiment, the delays and rates of change for a number of up-down transitions and down-up transitions are averaged to lessen the effects of disturbances on the measurements. Equations 13 and 14 are calculated with $A_1$ being the average of the slopes for the "down" lines (Line$_2$ and Line$_4$ in FIG. 4) and $A_2$ being the average of the slopes for the "up" lines (Line$_1$, Line$_3$ and Line$_5$ in FIG. 4). The lag time is calculated in Equation 15 for each up transition ($L_{U23}$ and $L_{U45}$ in FIG. 4) and then averaged to obtain an average "up" lag time $L_U$. The lag time is also calculated for each down transition ($L_{D12}$ and $L_{D34}$ in FIG. 4) then averaged to obtain an average "down" lag time $L_D$. To compensate for the worst case, the overall process lag time L is estimated as the maximum of $L_U$ and $L_D$. Equations 13–14 can easily be modified to estimate values for a process that is reverse acting by exchanging $U_1$ and $U_2$.

Once the process model parameters have been estimated, the parameters are provided to control parameter rule circuit 128 which tunes the control parameters $K_P$, $T_I$ and $T_D$ according to selected rules. Although any suitable set of rules can be used according to the present invention, circuit 128 preferably includes internal model-based control tuning rules. With Equations 9 and 13–15, the process model parameters can be estimated with very low computational complexity. With IMC tuning rules, the corresponding control parameters for PID controllers can be derived from:

$$K_P = \frac{2\tau + L}{m_1(\tau + L/2)^2} \quad \text{Eqs. 16–18}$$

$$T_I = 2\tau + L$$

$$T_D = \frac{\tau L + L^2/4}{2\tau + L}$$

where $K_P$, $T_I$ and $T_D$ are the proportional gain, integral time and derivative time, respectively, of PID controller 104, and $\tau$ is a desired closed loop response time constant. The control parameters for P, PI and PD controllers are slightly different from those in Equations 16 and 17 and can be found in *Internal Model Control, PID Controller Design*, 25 Ind. Eng. Chem. Process Des. Dev. 252–65 (1986). According to the present invention, the time constant $\tau$ is defined as a function of a performance factor $\alpha$, where $$\tau = \alpha L \quad \text{Eq. 19}$$

The performance factor $\alpha$ is preferably greater than 1 to cover the degrees of desired performance. For example, $\alpha=2$ generates a critically damped closed loop response. A smaller $\alpha$ generates a more aggressive, faster response and a larger $\alpha$ generates a more conservative, slower response. Inserting Equation 19 into Equations 16–18, the corresponding PID tuned control parameters become:

$$K_P = \frac{4}{m_1 T_I} \quad \text{Eqs. 20–22}$$

$$T_I = (2\alpha + 1)L$$

$$T_D = \frac{\alpha + 1/4}{2\alpha + 1} L$$

The PID tuned control parameters $K_P$, $T_I$ and $T_D$ can therefore be calculated by control parameter rule circuit 128 with low computational complexity. The performance factor $\alpha$ is provided to circuit 128 through an input 132 and control circuit 122. In the embodiment shown in FIG. 2, the performance factor $\alpha$ is provided to microprocessor 48 by master controller 10 as a digital value modulated on loop 20.

EXAMPLE

Figure 5:
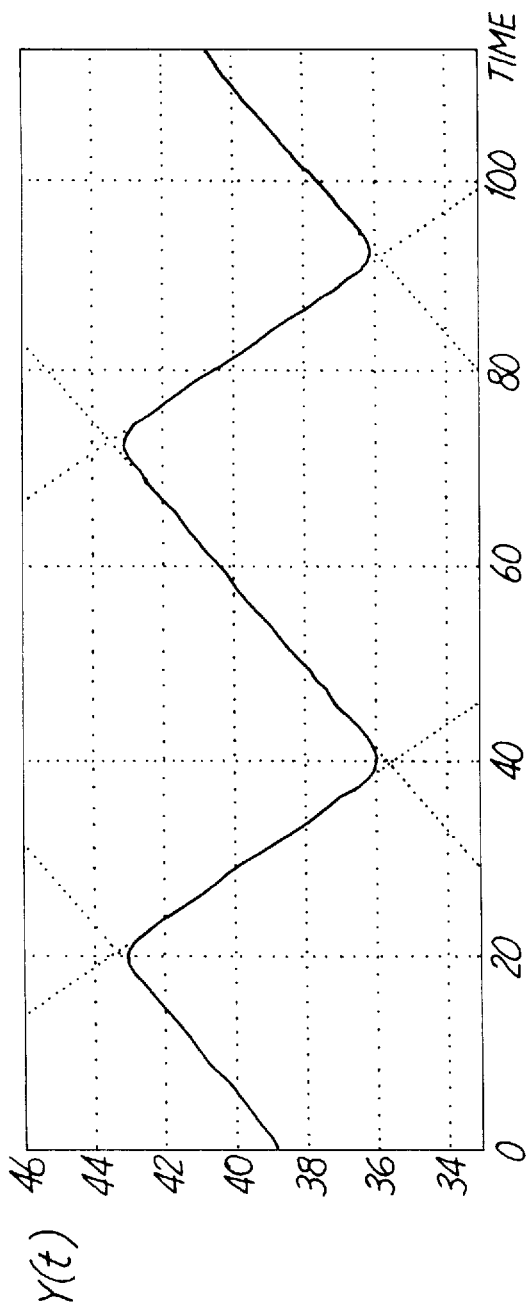
FIG. 5 is a waveform diagram illustrating test data of the asymptotic auto-tuning procedure of the present invention.
Figure 5:
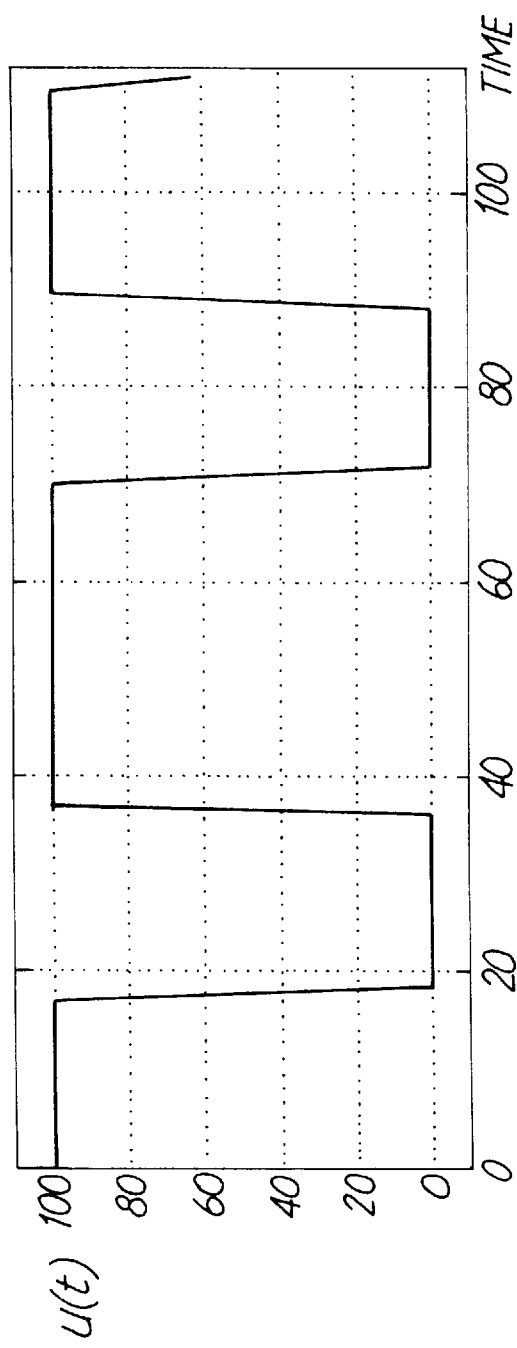

The process parameter estimation procedure reflected in Equations 9 and 13–15 was tested in an experiment. A Rosemount Field Controller (also known as 3095LC) was connected through a HART® modem to a personal computer (PC) running Intellution® software to control the level process described in FIG. 1. The Intellution® software sent requests to the Field Controller to alternate the control output u(t) between $U_1$ and $U_2$ and then continuously received sequential samples of the process variable y(t) through the HART™ modem. The received data was time stamped, which showed a variable sampling period between 1.0 seconds and 2.8 seconds. A sample of the data is shown below and is plotted in FIG. 5 with five fitted asymptotes shown in phantom:

$y_1(t)-0.2311t+38.71$ for $u(t)=100\%$ when $0 \leq t<17.3s$ $y_2(t)=-0.4034+51.61$ for $u(t)=0\%$ when $17.3 \leq t<36.25$ $y_3(t)=0.2378t+26.17$ for $u(t)=100\%$ when $36.25 \leq t<70$.

$y_4(t)=-0.4031t+72.90$ for $u(t)=0\%$ when $70.2 \leq t 88.21$ $y_5(t)=0.2348t+14.24$ for $u(t)=100\%$ when $88.21 \leq t<110$. \quad Eq. 23

From this data, it can be seen that the asymptote estimation procedure of the present invention is very robust since the slopes of each line are fairly repeatable which leads to repeatable estimates of the process gain constant and the process lag time, which leads to consistent PID tuning results.

In an alternative embodiment, process model estimation circuit 126 and control parameter rule circuit 128 are combined and the control parameters are calculated directly as a function of $A_1$, $B_1$, $A_2$, and $B_2$. The process model parameter equations are folded into the control parameter equations such that separate calculations of the process model parameters are unnecessary.

In the previous discussion, it has been assumed that the process is linear. For a non-linear process, such as a process with non-linear valve characteristics and head pressure effects on the valve, the actual stable state valve position during normal closed loop control at the end of time sequence $t_A$ replaces the estimated value $U_{EST}$ in Equation 13 for a more improved performance.

The auto-tuning circuit of the present invention can also be implemented in a valve controller, for example. FIG. 6 is similar to FIG. 2 and is a block diagram of a valve controller 160 which includes input filter circuit 162, voltage regulator 164, adjustable current sink 166, current transducer 168, demodulator 170, A/D converter 172, modulator 174, microprocessor 176, memory 178, clock circuit 180, D/A converter 182 and actuator 184. Circuit 162, regulator 164, and current transducer 168 are connected in series with process control loop 186 for receiving the measured process variable y(t) and modulated digital data, such as a set point $Y_{SET}$, from the loop.

Demodulator 170 demodulates the data and provides the data to microprocessor 176 for analysis. Regulator 164 receives power from loop 186 and provides a regulated voltage for powering the elements of valve controller 160. Current transducer 168 measures the analog current level y(t) in loop 186, which is converted by A/D converter 172 into digital data for microprocessor 176. Microprocessor 176 transmits data over loop 186 by modulating the current through sink 166 with modulator 174, such as by the HART® protocol. The auto-tuning algorithm, control algorithm, process model and tuning parameters are stored in memory 178 for configuring microprocessor 176 to control actuator 184 through D/A converter 182 as a function of the measured process variable y(t) and the set point $Y_{SET}$.

In another alternative embodiment, the auto-tuning circuit of the present invention is implemented in a motor control for a pump. This embodiment has a similar structure and function as that shown and discussed with reference to FIG. 6.

The asymptotic auto-tuning circuit of the present invention has several advantages that are not present in existing tuning techniques. The asymptotic auto-tuning circuit generates accurate repeatable model parameters with only simple calculations. The simple calculations allow the auto-tuning circuit to be implemented in low-power and low-memory applications, such as in field-mounted controllers. A 4–20 mA current loop provides only a few milli-amps after the signal range is subtracted to power all of the electronic components in the unit. This limits the complexity of the components and the memory space. A typical memory in a transmitter may be limited to 8K to 64K bytes, for example.

The asymptotic auto-tuning circuit of the present invention does not require much user interaction. Unlike the Ziegler-Nichols' open loop test, the auto-tuning circuit of the present invention does not require users to establish a stable state before the open loop test is run and instead has an ability to assess the stable state conditions. The user sets up the tuning procedure by providing initial variables such as desired $U_1$ and $U_2$ levels, selects a desired performance factor $\alpha$ and then initiates the auto-tuning procedure. The auto-tuning circuit of the present invention can be implemented as a manual operation or an automatic operation, and it can be operated in the loop commissioning stage at system initialization, or at any other time the user wishes to tune the loop. For automatic operation, the auto-tuning circuit is capable of bringing the process variable close to the set point and starting the tuning exercise automatically without the user's involvement. With manual operation, the user brings the process variable close to the set point and then initiates tuning through master controller 10.

The auto-tuning circuit of the present invention generates a guided disturbance of the process. The consecutive, intersecting asymptotes can be determined from the measured process variable as the process variable switches between rising and falling states, which can be a switch from the rising to the falling state or a switch from the falling to the rising state. Unlike closed loop relay control based tuning or other frequency domain techniques, the present invention can be restricted to operate within a defined zone. For example, some users may prefer a u(t) disturbance of only 10% and 75% of the full scale. The auto-tuning circuit is simple, user friendly, repeatable and robust. It can be used to tune control parameters for P, PI, PD, PID and other types of controllers such as fuzzy logic controllers. Suitable fuzzy logic controllers are described in the article "Auto-Tuned Fuzzy Logic Control," by J. Qin, *ACC Conference* 1994, Baltimore Md., which is hereby incorporated by reference. The auto-tuning circuit can also be used in multi-loop control applications, such as matrix controllers and cascade controllers.

Although the present invention has been described with reference to preferred embodiments, workers skilled in the art will recognize that changes may be made in form and detail without departing from the spirit and scope of the invention. The tuning circuit can be implemented as a software routine or algorithm stored in memory for execution by a programmed computer, such as a microprocessor. In alternative embodiments, the circuit is implemented in digital or analog hardware. The tuning circuit can be located in the transmitter, in the valve or in master controller 10. Master controller 10 can be located in a central control room, at a remote location near the transmitter or valve or in a hand-held configurator which is used to configure the transmitter during the commissioning stage. The tuning circuit can estimate the process model parameters and tune the control parameters in different calculation stages or can fold the process model parameter equations into the control parameter equations such that there is only one calculation stage. Other configurations can also be used according to the present invention.

What is claimed is:

1. A process control apparatus for controlling a process through a control output signal as a function of a measured process variable, comprising:

control means having a process variable input and a control output, wherein the control means generates the control output signal on the control output in response to the measured process variable received on the process variable input and based on control function parameters; and tuning means comprising:
excitation means having an excitation output coupled to the control output for generating an excitation signal having a waveform that causes the process variable to switch between maximally rising and maximally falling states, the rising and falling states having intersecting rising and falling asymptotes;
estimating means for determining the rising and falling asymptotes and for estimating a process model based on the asymptotes and the intersection between the asymptotes; and
parameter calculating means coupled to the estimating means for calculating the control function parameters based on the process model.

2. The process control apparatus of claim 1 wherein the estimating means comprises means for determining a slope A and an intercept B of the rising and falling asymptotes according to the following expression:

$$\begin{bmatrix} A \\ B \end{bmatrix} = \frac{1}{N\Sigma t_n^2 - (\Sigma t_n)^2} \begin{bmatrix} N \cdot \Sigma t_n y(t_n) - \Sigma t_n \cdot \Sigma y(t_n) \\ \Sigma t_n^2 \cdot \Sigma y(t_n) - \Sigma t_n \cdot \Sigma t_n y(t_n) \end{bmatrix}$$

for n=1 to N, where N is a number of samples of the process variable, $t_n$ is the time at which each sample n is taken, $y(t_n)$ is the process variable at time $t_n$.

3. The process control apparatus of claim 1 wherein the estimating means defines the rising asymptote with an equation $y(t)=A_1 t+B_1$ where t is time, y(t) is the process variable over time, $A_1$ and $B_1$ are a slope and intercept of the rising asymptote and defines the falling asymptote with an equation $y(t)=A_2 t+B_2$ where $A_2$ and $B_2$ are a slope and intercept of the falling asymptote.

4. The process control apparatus of claim 3 wherein the excitation output waveform has a level $U_1$ during the falling state of the process variable and a level $U_2$ during the rising state of the process variable and wherein the estimating means estimates a process gain constant $m_1$ according to the expression:

$$m_1 = \frac{A_2 - A_1}{U_2 - U_1}$$

5. The process control apparatus of claim 4 wherein the excitation waveform causes the process variable to alternate between the rising and falling states and wherein the estimating means determines the asymptotes of each of the rising and falling states and calculates the slope $A_1$ in the expression recited in claim 4 as an average of the slopes of the rising states and the slope $A_2$ as an average of the slopes of the falling states.

6. The process control apparatus of claim 3 wherein the excitation output waveform switches from a first level to a second level at a switch time $t_{SW}$ and the rising and falling asymptotes intersect at an intersection time $t_{INT}$ and wherein the estimating means estimates a process lag time L based upon a difference between the intersection time $t_{INT}$ and the switch time $t_{SW}$.

7. The process control apparatus of claim 6 wherein the estimating means estimates the process lag time L according to the expression:

$$L = t_{INT} - t_{SW} = \frac{B_2 - B_1}{A_1 - A_2} - t_{SW}$$

8. The process control apparatus of claim 7 wherein the excitation waveform causes the process variable to have a plurality of rising-to-falling transitions and a plurality of falling-to-rising transitions and wherein the estimating means estimates a sample process lag time $L_D$ for each rising-to-falling and transition and a sample process lag time $L_U$ for each falling-to-rising transition according to the expression in claim 6, averages the sample process lag times $L_U$, averages the sample process lag times $L_D$ and determines an overall process lag time as a maximum of the averages sample lag times $L_U$ and $L_D$.

9. The process control apparatus of claim 1 wherein the excitation means comprises:
means for incrementing the excitation output from a selected value $U_1$ to a selected value $U_2$, which is greater than $U_1$ and for decrementing the excitation output from $U_2$ to $U_1$.

10. The process control apparatus of claim 1 wherein the excitation means comprises:
means for decrementing the excitation output from a selected value $U_2$ to a selected value $U_1$, which is lower than $U_2$ and for incrementing the excitation output from $U_1$ to $U_2$.

11. The process control apparatus of claim 1 wherein the control means is selected from the group consisting of P, PI, PD, PID and fuzzy logic controllers.

12. The process control apparatus of claim 1 wherein the control means is selected from the group consisting matrix and cascade controllers.

13. The process control apparatus of claim 1 and further comprising a sensor for measuring the process variable and providing a signal indicative of the measured process variable to the process variable input of the control means.

14. A smart field-mounted controller which is powered by a process control loop and controls a process through a control output signal as a function of a measured process variable, comprising:
an input-output circuit configured to be coupled to the process control loop and for receiving power solely from the process control loop;
a controller having a process variable input and a control output, wherein the controller generates the control output signal on the control output in response to the measured process variable received on the process variable input and based on control function parameters;
a tuning circuit comprising:
an excitation circuit having an excitation output coupled to the control output, which generates an excitation signal that switches at a time $t_{SW}$ between a first level with which the process variable varies in a first direction along a first asymptote and a second level with which the process variable varies in a second direction along a second asymptote and opposite to the first direction, wherein the first and second asymptotes intersect at a time $t_{INT}$;
an estimating circuit coupled to the process variable input, which estimates a lag time L of the process in response to the process variable, wherein L=$t_{INT}$-$t_{SW}$; and
a parameter calculating circuit coupled to the estimating circuit and the control circuit, which calculates the control function parameters based on the lag time L and control function rules; and
a memory coupled to the control and tuning circuits which stores the control function parameters and the control function rules.

15. The smart field-mounted controller of claim 14 wherein the input-output circuit is configured to be coupled to the process control loop, which is selected from the group consisting of two-wire, three-wire and four-wire process control loops.

16. The smart field-mounted controller of claim 14 wherein the process control loop is a two-wire process control loop and the input-output circuit is configured to be coupled to and receive power from the two-wire process control loop.

17. The smart field-mounted controller of claim 14 wherein the smart field-mounted controller comprises a valve controller.

18. The smart field-mounted controller of claim 14 wherein the smart field-mounted controller comprises a motor controller for a pump.

19. A method of determining tuning parameters for a process control system which controls a process through a control output signal as a function of a measured process variable and a set point, the method comprising:
varying the control output signal over time such that the measured process variable switches consecutively between a rising state and a falling state;

determining a rising asymptote of the measured process variable in the rising state;

determining a falling asymptote of the measured process variable in the falling state;

determining a time $t_{INT}$ at which the rising and falling asymptotes intersect; and tuning the function of the process control system based on the rising and falling asymptotes and the time $t_{INT}$ at which the asymptotes intersect.

20. The method of claim 19 wherein:

varying the control output signal comprises switching the control output signal from a first level to a second level at a switch time $t_{SW}$; and the step of tuning comprises estimating a lag time L of the process according to the expression $L = t_{INT} - t_{SW}$.

21. The method of claim 19 wherein:

the step of varying the control output signal comprises switching the control output signal between a first level $U_1$ and a second level $U_2$;

the step of determining a rising asymptote comprises fitting a curve $y(t) = A_1 t + B_1$ to the measured process variable, where t is time, y(t) is the measured process variable a time t and $A_1$ and $B_1$ are the slope and intercept in the rising state;

the step of determining a falling asymptote comprises fitting a curve $y(t) = A_2 t + B_2$ to the measured process variable, where $A_2$ and $B_2$ are the slope and intercept in the falling state;

the step of tuning comprises estimating again constant $m_1$ of the process according to the expression:

$$m_1 = \frac{A_2 - A_1}{U_2 - U_1}$$

22. The method of claim 19 wherein the step of tuning comprises defining a model of the process and wherein the method further comprises:

coupling first and second smart field-mounted controllers to one another over a process control loop;

performing the step of tuning with the first smart field-mounted controller; and passing the model of the process from the first smart field-mounted controller to the second smart field-mounted controller.

* * * * *